US012757149B2

(12) United States Patent
Guo

(10) Patent No.: US 12,757,149 B2
(45) Date of Patent: Oct. 6, 2026

(54) METHOD FOR INCREASING ACCURACY OF POSITION ESTIMATION, SYSTEM, AND STORAGE MEDIUM

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 419 days.

(21) Appl. No.: 18/346,257

(22) Filed: Jul. 2, 2023

(65) Prior Publication Data

US 2023/0354251 A1 Nov. 2, 2023

Related U.S. Application Data

(63) Continuation of application No. PCT/IB2022/050047, filed on Jan. 4, 2022.

(Continued)

(51) Int. Cl.
*H04W 64/00* (2009.01)
*H04L 5/00* (2006.01)
*H04W 24/10* (2009.01)

(52) U.S. Cl.
CPC ........... *H04W 64/00* (2013.01); *H04L 5/0048* (2013.01); *H04W 24/10* (2013.01)

(58) Field of Classification Search
CPC .............................. H04W 24/10; H04W 64/00

(Continued)

(56) References Cited

U.S. PATENT DOCUMENTS 11,917,650 B2 * 2/2024 Sha .......................... H04W 4/06
11,956,038 B2 * 4/2024 Shreevastav ......... H04B 7/0417

(Continued)

FOREIGN PATENT DOCUMENTS

CN 111586832 8/2020
EP 3952411 2/2022

(Continued)

OTHER PUBLICATIONS

"3rd Generation Partnership Project; Technical Specification Group Radio Access Network; NR; Physical channels and modulation (Release 16)," 3GPP TS 38.211, Dec. 2019, v16.0.0.

(Continued)

*Primary Examiner* — Joseph Arevalo
(74) *Attorney, Agent, or Firm* — Hodgson Russ LLP

(57) ABSTRACT

A method includes receiving, at a user equipment, configuration data of a downlink positioning reference signal resource set, wherein the configuration data indicates an association between a first downlink positioning reference signal resource and a second downlink positioning reference signal resource; obtaining a first reference signal received power measurement of the first downlink positioning reference signal resource and a second reference signal received power measurement of the second downlink positioning reference signal resource; and transmitting the first reference signal received power measurement and the second reference signal received power measurement to a transmission/reception point based on the association between the first downlink positioning reference signal resource and the second downlink positioning reference signal resource.

18 Claims, 4 Drawing Sheets

100

Related U.S. Application Data

(60) Provisional application No. 63/133,880, filed on Jan. 5, 2021.

(58) Field of Classification Search
USPC ... 455/456.1, 456.6, 456.2, 456.5, 403, 522, 455/452.1, 73, 450, 434, 443, 436, 404.2, 455/556.1
See application file for complete search history.

(56) References Cited

U.S. PATENT DOCUMENTS

| | | | | |
|---|---|---|---|---|
| 2010/0087219 | A1* | 4/2010 | Jonsson | H04W 52/24 455/522 |
| 2019/0261149 | A1* | 8/2019 | Okumura | H04W 4/80 |
| 2020/0267684 | A1* | 8/2020 | Huang | H04L 5/005 |
| 2022/0311488 | A1* | 9/2022 | Shreevastav | H04B 7/0408 |
| 2022/0417867 | A1* | 12/2022 | Yoshioka | H04W 52/10 |
| 2023/0164723 | A1* | 5/2023 | Zhang | H04B 17/318 370/503 |
| 2023/0319772 | A1* | 10/2023 | Alawieh | H04W 16/28 455/456.1 |
| 2023/0353219 | A1* | 11/2023 | Yu | H04B 17/318 |
| 2023/0358844 | A1* | 11/2023 | Ren | G01S 5/0036 |

FOREIGN PATENT DOCUMENTS

| | | | |
|---|---|---|---|
| WO | 2020192219 | 10/2020 | |
| WO | 2020206021 | 10/2020 | |
| WO | WO-2020206021 A1 * | 10/2020 | H04W 4/029 |
| WO | 2020220803 | 11/2020 | |
| WO | WO-2022022491 A1 * | 2/2022 | H04W 74/0833 |
| WO | WO-2022031889 A1 * | 2/2022 | H04L 5/0053 |

OTHER PUBLICATIONS

"3rd Generation Partnership Project; Technical Specification Group Radio Access Network; NR; Multiplexing and channel coding (Release 16)," 3GPP TS 38.212, Dec. 2019, v16.0.0.

"3rd Generation Partnership Project; Technical Specification Group Radio Access Network; NR; Physical layer procedures for control (Release 16)," 3GPP TS 38.213, Dec. 2019, v16.0.0.

"3rd Generation Partnership Project; Technical Specification Group Radio Access Network; NR; Physical layer procedures for data (Release 16)," 3GPP TS 38.214, Dec. 2019, v16.0.0.

"3rd Generation Partnership Project; Technical Specification Group Radio Access Network; NR; Physical layer measurements (Release 16)," 3GPP TS 38.215, Dec. 2019, v16.0.0.

"3rd Generation Partnership Project; Technical Specification Group Radio Access Network; NR; Medium Access Control (MAC) protocol specification (Release 16)," 3GPP TS 38.321, Mar. 2020, v16.0.0.

"3rd Generation Partnership Project; Technical Specification Group Radio Access Network; NR; Radio Resource Control (RRC) protocol specification (Release 16)," 3GPP TS 38.331, Mar. 2020, v16.0.0.

Oppo, "Discussion on Measurements for NR Positioning," 3GPP TSG RAN WG1 #99, R1-1911849, Nov. 2019.

LG Electronics, "Discussions on DL and UL Reference Signals for NR Positioning," 3GPP TSG RAN WG1 #96bis, R1-1904200, Apr. 2019.

WIPO, International Search Report and Written Opinion for International Application No. PCT/IB2022/050047, Mar. 29, 2022.

Qualcomm Incorporated, "On PRS-RSRP measurements for NR positioning," 3GPP TSG-RAN WG4 Meeting #94-e, R4-2000732, Feb. 2020.

Intel Corporation, "UE and gNB Measurements for NR Positioning," 3GPP TSG RAN WG1 Meeting #96bis, R1-1904321, Apr. 2019.

EPO, Extended European Search Report for EP Application No. 22736683.8, May 23, 2024.

* cited by examiner

METHOD FOR INCREASING ACCURACY OF POSITION ESTIMATION, SYSTEM, AND STORAGE MEDIUM

CROSS-REFERENCE TO RELATED APPLICATION(S)

This application is a continuation of International Application No. PCT/IB2022/050047, filed Jan. 4, 2022, which claims priority to U.S. Provisional Application No. 63/133,880, filed Jan. 5, 2021, the entire disclosures of which are incorporated herein by reference.

TECHNICAL FIELD

This application relates to the communications field, and more specifically, to a method for increasing an accuracy of position estimation, a system, and a storage medium.

BACKGROUND

5G New Radio (NR) technology provides significant communication capabilities that permit user devices to send and receive data, take advantage of distributed computing resources, and offload computing to other devices. These improvements are provided in part by the higher frequencies of 5G signals, which permit significant increases in bandwidth. However, these increases in bandwidth come at the cost of reduced signal penetration through materials and reduced effective ranges. NR technology incorporates the use of multiple input, multiple output (MIMO) technology to transmit multiple data streams in the form of multiple directed beams projected from directional antennas to address these challenges. Directed beams may focus communication signals towards the direction of a user equipment (UE). Each directional antenna may transmit a set of directed, high-frequency signals to a UE to provide data to the UE.

SUMMARY

In a first aspect, a method for increasing an accuracy of position estimation is provided. The method includes: receiving, at a user equipment, configuration data of a downlink positioning reference signal resource set, wherein the configuration data indicates an association between a first downlink positioning reference signal resource and a second downlink positioning reference signal resource; obtaining a first reference signal received power measurement of the first downlink positioning reference signal resource and a second reference signal received power measurement of the second downlink positioning reference signal resource; and transmitting the first reference signal received power measurement and the second reference signal received power measurement to a transmission/reception point based on the association between the first downlink positioning reference signal resource and the second downlink positioning reference signal resource.

In a second aspect, a system is provided. The system includes a computer system that comprises one or more processors programmed with computer program instructions that, when executed, cause the computer system to perform operations comprising: receiving, at a user equipment, configuration data of a downlink positioning reference signal resource set, wherein the configuration data indicates an association between a first downlink positioning reference signal resource and a second downlink positioning reference signal resource; obtaining a first signal measurement of the first downlink positioning reference signal resource and a second signal measurement of the second downlink positioning reference signal resource; determining a value based on the second signal measurement; and transmitting the first signal measurement and the value to a transmission/reception point based on the association between the first downlink positioning reference signal resource and the second downlink positioning reference signal resource.

In a third aspect, a non-transitory storage medium is provided. The storage medium includes storing program code that, when executed by a computer system, causes the computer system to perform operations comprising: receiving, at a user equipment, configuration data of a downlink positioning reference signal resource set, wherein the configuration data indicates an association between a first downlink positioning reference signal resource and a second downlink positioning reference signal resource; obtaining a first signal measurement of the first downlink positioning reference signal resource and a second signal measurement of the second downlink positioning reference signal resource; determining a first value based on the first signal measurement; determining a second value based on the second signal measurement; and transmitting the first value and the second value to a transmission/reception point based on the association between the first downlink positioning reference signal resource and the second downlink positioning reference signal resource.

DETAILED DESCRIPTION

Figure 1:
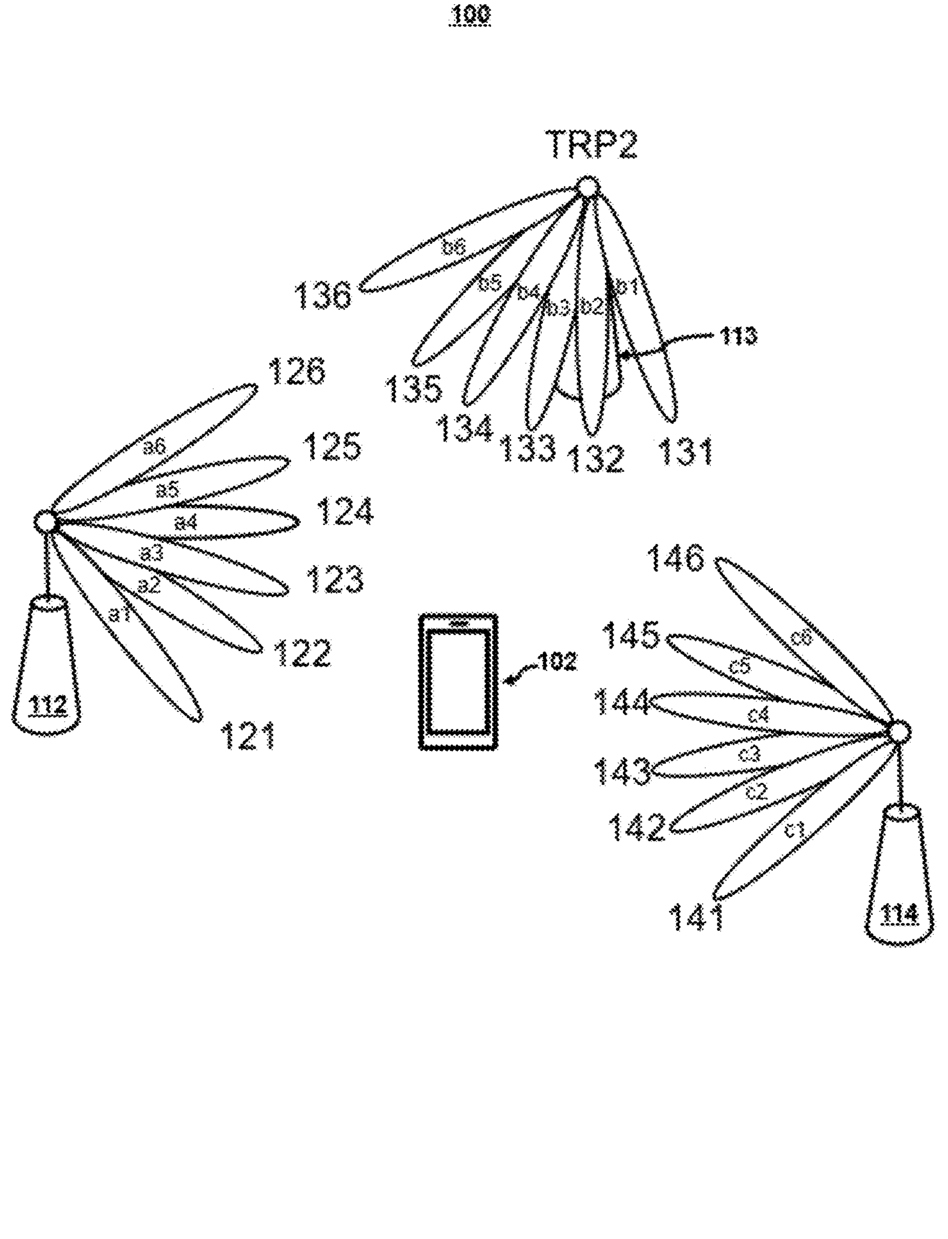
FIG. 1 shows an illustrative system for determining the position of user equipment based on transmitted power measurements, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

In the context of 3GPP New Radio (NR) technology, downlink (DL) positioning reference signal (PRS) supports downlink time difference-based positioning technology. A transmit/receive point (TRP) may transmit the PRS via a transmit beam to a UE. The UE is capable of measuring properties of the transmit beam or data carried by the transmit beam to estimate the location of the UE, where such values may include arrival times, signal reference signal received power (RSRP), signal arrival angles, or the like.

However, the accuracy of conventional positioning methods, such as an angle-of-departure method, may be reduced by errors caused by physical interference between an antenna projecting a transmit beam, sensor problems, or the like.

Some embodiments may address such issues by receiving configuration data sent from a TRP with UE, where the configuration includes a DL PRS resource set that identifies a plurality of DL PRS resources. For example, a received DL PRS resource set may include a first DL PRS resource and a second DL PRS resource. Some embodiments may then measure a set of RSRP measurements corresponding with the set of DL PRS resources. For example, some embodiments may measure a first RSRP measurement corresponding with the first DL PRS resource and a second RSRP corresponding with the second DL PRS resource. The UE may then transmit values based on some or all of the RSRP measurements to the TRP, where a determination of the values to send may be based on associations between DL PRS resources indicated by the configuration data sent from the TRP. For example, some embodiments may obtain an indication that a first DL PRS resource indexed by a first index value is associated with a second DL PRS resource indexed by a second resource value from a configuration sent by a TRP. The association between DL PRS resource values may be based on a physical proximity of transmit beams with respect to each other. Some embodiments may then send a first RSRP measurement indexed by the first index value and a second RSRP measurement indexed by the second index value to the TRP that sent the transmit beam. In some embodiments, the associated DL PRS resources may be adjacent with respect to each other, where the geometric arrangement of antennas sending the DL PRS resources may be used in conjunction with RSRP measurements to determine a more accurate position of a UE.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of “a,” “an,” and “the” include plural referents unless the context clearly dictates otherwise. In addition, as used in the specification and the claims, the term “or” means “and/or” unless the context clearly dictates otherwise. Additionally, as used in the specification, “a portion,” refers to a part of, or the entirety of (i.e., the entire portion), a given item (e.g., data) unless the context clearly dictates otherwise. Furthermore, a “set” may refer to a singular form or a plural form, such as that a “set of items” may refer to one item or a plurality of items.

A 5G system may rely on the use of directed beams to convey data to and from user equipment (UE), such as cell phones, tablets, smart vehicles, or other mobile computing devices. These directed beams may be projected by a transmission/reception point (TRP), which may also be referred to as a base station, a node B, a next-generation node B (gNB), a new radio (NR) base station, or the like. In many cases, the TRP includes multiple directional antennas, each capable of projecting a transmit beam in a specific direction. In addition to sending data to a UE, a TRP may also send configuration data to the UE that may cause the UE to provide measurements back to the TRP.

Some embodiments may use one or more of the measurements provided by a UE to perform a positioning operation to determine a position of the UE. For example, a set of TRPs may send configuration data to a UE, where the configuration data may cause the UE to send reference signal received power (RSRP) measurements of multiple DL PRS resources sent from the set TRPs back to the set of TRPs. Alternatively, or in addition, the RSRP measurements of multiple DL PRS resources from multiple TRPs sent from the UE may be received by a different receiver not attached to the multiple TRPs. A TRP or another device that received the RSRP measurements may then provide the measurements to a location server or other computer system. The location server or other computer system may perform a DL-Angle-of-Departure (angle of departure) operation to calculate the position of the UE based on the RSRP measurements of resources of multiple TRPs. In some embodiments, the UE may be specified in accordance with 3GPP TS 38.214 V16.0.0, the entirety of which is incorporated herein by reference. For example, some embodiments may configure the UE to measure and report up to eight DL PRS RSRP measurements for different DL PR as resources from the same cell. Furthermore, some embodiments may cause the UE to indicate which DL PRS RSRP measurements have been performed using the same special domain filter for signal reception. For example, a UE may be configured to indicate that a first RSRP measurement and a second RSRP measurement were measured using the same special domain filter.

Some embodiments performing conventional angle of departure operations may suffer from issues such as real-world barriers or antenna misalignments. For example, the use of the RSRP from DL PRS reporting from a UE may fail to consider the negative impact of physical obstacles that prevent line-of-sight (LOS) communication between an antenna of TRP and a UE. By incorporating RSRP measurements of non-LOS beams, conventional angle of departure calculations may unintentionally introduce significant errors in a final UE position determination. Furthermore, the accuracy of an angle of departure position estimate may depend on a beamwidth of a directed beam. However, implementing an angle of departure algorithm in various real-world environments may require a large number of DL PRS resources to support such beamwidth-reliant operations. This requires a correspondingly large overhead of DL PRS resource transmission information, which may impair actual data throughput.

Some embodiments may reduce positioning inaccuracies and the impact of physical obstacles that inhibit LOS communication by sending or receiving configuration data that cause a UE to transmit RSRPs of adjacent beams sent from a TRP. The TRP or a computer system connected to the TRP may use the multiple RSRPs to determine a position of the UE. By more accurately determining the position of the UE, the TRP may consequently provide a more effective signal to the UE, predict UE motion, or more efficiently communicate with the UE.

FIG. 1 shows an illustrative system for determining the position of user equipment based on transmitted power measurements, in accordance with one or more embodiments. A user UE 102 may receive directed beams from a TRP 112, a TRP 113, and a TRP 114. The UE 102 may receive signals from each of the TRPs 112-114. The TRP 112 may transmit a first set of DL PRS resources that include the DL PRSs {a_1, a_2, a_3, a_4, a_5, a_6}, each of which may be carried by one of the TRP transmit beams 121-126. Each TRP transmit beam of the TRP transmit beams 121-126 may be transmitted by a directional antenna of the TRP 112 and may provide data to the UE 102. Furthermore, the TRP 113 may transmit a first set of DL PRS resources that include the DL PRSs {b_1, b_2, b_3, b_4, b_5, b_6}, each of which may be carried by one of the TRP transmit beams 131-136. Each TRP transmit beam of the TRP transmit beams 131-136 may be transmitted by a directional antenna of the TRP 113 and may provide data to the UE 102. The TRP 114 may transmit a first set of DL PRS resources that include the DL PRSs {c_1, c_2, c_3, c_4, c_5, c_6}, each of which may be carried by one of the TRP transmit beams 141-146. Each TRP transmit beam of the TRP transmit beams 141-146 may be transmitted by a directional antenna of the TRP 114 and may provide data to the UE 102.

The set of TRPs 112-114 may provide the UE 102 with configuration data that defines or otherwise indicates DL PRS resources. In some embodiments, the TRP 112 may provide configuration data for the DL PRS resources carried by the TRP transmit beams 121-126, where the configuration data may include indications that the DL PRS resources {a_1, a_2, a_3, a_4, a_5, a_6} are carried by the TRP transmit beams 121-126. Alternatively, or in addition, the configuration data may indicate that each DL PRS resource a_i is associated with the DL PRS resource a_i+1, where resource a_i and a_i+1 are transmitted via adjacent beams. For example, configuration data sent to the UE 102 may indicate that the DL PRS resources a_1 and a_2 are associated, where the configuration data may have been updated with this association based on a determination that the transmit beams used to send the DL PRS resources a_1 and a_2 are adjacent. As used in this disclosure, the spatial adjacency or other spatial association of two beams may be reflected in the adjacency or other spatial configuration of the antennas of the TRP used to project the two beams.

Similarly, the TRP 113 may provide configuration data for the DL PRS resources carried by the TRP transmit beams 131-136, where the configuration data may include indications that the DL PRS resources {b_1, b_2, b_3, b_4, b_5, b_6} are carried by the TRP transmit beams 131-136. Alternatively, or in addition, the configuration data may indicate that each DL PRS resource b_i is associated with the DL PRS resource b_i+1, where resources b_i and b_i+1 are transmitted by adjacent beams. Additionally, the TRP 114 may provide configuration data for the DL PRS resources carried by the TRP transmit beams 141-146, where the configuration data may include indications that the DL PRS resources {c_1, c_2, c_3, c_4, c_5, c_6} are carried by the TRP transmit beams 141-146. Alternatively, or in addition, the configuration data may indicate that each DL PRS resource c_i is associated with the DL PRS resource c_i+1, where resources c_i and c_i+1 are carried by adjacent beams. As used in this disclosure, the term "adjacent DL PRS resources" may indicate a set of DL PRS resources that are sent via a set of adjacent TRP transmit beams. For example, if a first DL PRS resource is transmitted via a first TRP transmit beam that is adjacent to a second TRP transmit beam, and if a second DL PRS resource is transmitted via the second TRP transmit beam, the first and second DL PRS resources may be described as adjacent DL PRS resources.

The UE 102 may be configured to measure DL PRS resources sent from the set of TRPs 112-114 by measuring the RSRP of the DL PRS resources. For example, the UE 102 obtain a first RSRP of the DL PRS resource a_1, a second RSRP of the DL PRS resource a_2, a third RSRP of the DL PRS resource a_3, a fourth RSRP of the DL PRS resource a_4, a fifth RSRP of the DL PRS resource a_5, and a sixth RSRP of the DL PRS resource a_6. After receiving the configuration data from the TRP 112, some embodiments may determine that the second RSRP is greatest and that the second RSRP should be reported by the UE 102. In addition, the configuration data may cause some embodiments to report the first RSRP and the third RSRP corresponding with the DL PRS resources ai and as, respectively, based on an association between the DL PRS resources {a_1, a_2, a_3} indicated by the configuration data. As described elsewhere in this disclosure, the association indicated by the configuration data may represent a spatial adjacency or another spatial association between the TRP transmit beams 121-123.

Similarly, configuration data sent from the TRP 113 may indicate that the DL PRS resources b_2 and b_4 are adjacent to the DL PRS resource b_3. The configuration data sent from the TRP 113 may cause the UE 102 to send RSRP measurements of the DL PRS resource b_2 and b_4 after determining that the RSRP measurement corresponding with the DL PRS b_3 is greatest. Furthermore, configuration data sent from the TRP 114 may indicate that the DL PRS resources c_3 and c_5 are adjacent to the DL PRS resource c_4. The configuration data sent from the TRP 114 may cause the UE 102 to send RSRP measurements of the DL PRS resource c_3 and c_5 after determining that the RSRP measurement corresponding with the DL PRS c_4 is greatest.

In some embodiments, the configuration data sent to a UE 102 may include a DL PRS resource set corresponding with the DL PRS resources of the TRP that sent the configuration data. For example, the TRP 112 may send configuration data to the UE 102 that includes information about a DL PRS resource set of the TRP 112. The DL PRS resource set may include one or more DL PRS resources, where each resource of the DL PRS resource set has an associated spatial transmission filter. Each resource of the DL PRS resources sent from a TRP may be sent via a TRP transmit beam, where the measurement of a DL PRS resource may be equivalent to measuring a TRP transmit beam. The configuration data may include information such as a DL PRS resource set identifier and a DL PRS periodicity that indicates the periodicity of a recurring DL PRS resource, where some or all of the DL PRS resources may be assigned with the same periodicity value. Alternatively, some embodiments may assign different periodicities to different DL PRS resources.

In some embodiments, the configuration data may include a shift value, where the shift value may represent the shift in index values corresponding with different DL PRS resources carried by spatially adjacent TRP transmit beams. The shift value may be a value greater than one, such as two, four, ten, 18, or some other number greater than one. For example, a TRP may include a set of directional antennas arranged in a lower level and upper level such that each level includes 18 directional antennas to send a corresponding 18 TRP transmit beams. Some embodiments may index the lower-level directional antennas with index values ranging from 1 to 18 and the upper-level directional antennas with index values ranging from 19 to 36. In such an index arrangement, the configuration data sent to a UE may cause a UE to report an associated RSRP of an associated DL PRS resource based on a determination that the associated DL PRS resource is greater or lesser than an initial DL PRS resource by a shift value of 18, where the initial DL PRS resource is associated with the greatest RSRP measurement.

In some embodiments, sending a DL PRS resource set may include sending a DL PRS resource set slot offset that defines a slot offset with respect to a system frame number (SFN) slot 0. Some embodiments may use the DL PRS resource set slot offset to determine a slot location of a DL PRS resource within a DL PRS resource set. Furthermore, in some embodiments, a UE may receive a DL PRS resource repetition factor when receiving configuration data. The DL PRS resource repetition factor may define or otherwise indicate a maximum number of times that each resource of a DL PRS resource set is repeated for a single instance of the DL PRS resource. In some embodiments, all resources of a DL PRS resource set may have the same DL PRS resource repetition factor. Alternatively, some embodiments may assign different DL PRS resource repetition factors to different DL PRS resources. Similarly, in some embodiments, the configuration data sent to the UE may include a DL PRS resource time gap. The DL PRS resource time gap may define a slot offset between two repeated instances of the same DL PRS resource. Furthermore, in some embodiments, the configuration data for a DL PRS resource set sent to the UE 102 from a TRP of the set of TRPs 112-114 may include a DL PRS resource muting pattern. The DL PRS resource muting pattern may define or otherwise indicate a bitmap of a time or time interval during which the DL PRS resource is expected not to be transmitted for a DL PRS resource set. Some embodiments may use the bitmap to more accurately determine a position of a UE by indicating measurements that fall outside of an expected time interval.

In addition to sending configuration data corresponding with a DL PRS resource set as a whole, some embodiments may provide the UE 102 with additional configuration parameters for an individual DL PRS resource. For example, a TRP of the set of TRPs 112-114 may send a DL PRS resource identifier and a DL PRS resource element (RE) offset. A DL PRS RE offset may define a starting RE offset of a first symbol within a DL PRS resource for a frequency. Alternatively, or in addition, some embodiments may provide a DL PRS resource slot offset, where the DL PRS resource slot offset may define a starting slot of the DL PRS resource with respect to the slot offset of the DL PRS resource set. Alternatively, or in addition, the configuration data sent to a UE may also include a DL PRS resource symbol offset that may define the starting symbol of the DL PRS resource within a slot. Alternatively, or in addition, configuration data sent to a UE may include a number of DL PRS symbols that define or otherwise indicate a number of symbols of DL PRS resources within a slot. In some embodiments, configuration status and to a UE may also include quasi co-location (QCL) configuration information. In some embodiments, the QCL configuration information for the PRS resource may find or otherwise indicate quasi-colocation information of the DL PRS resource with other reference signals.

Figure 2:
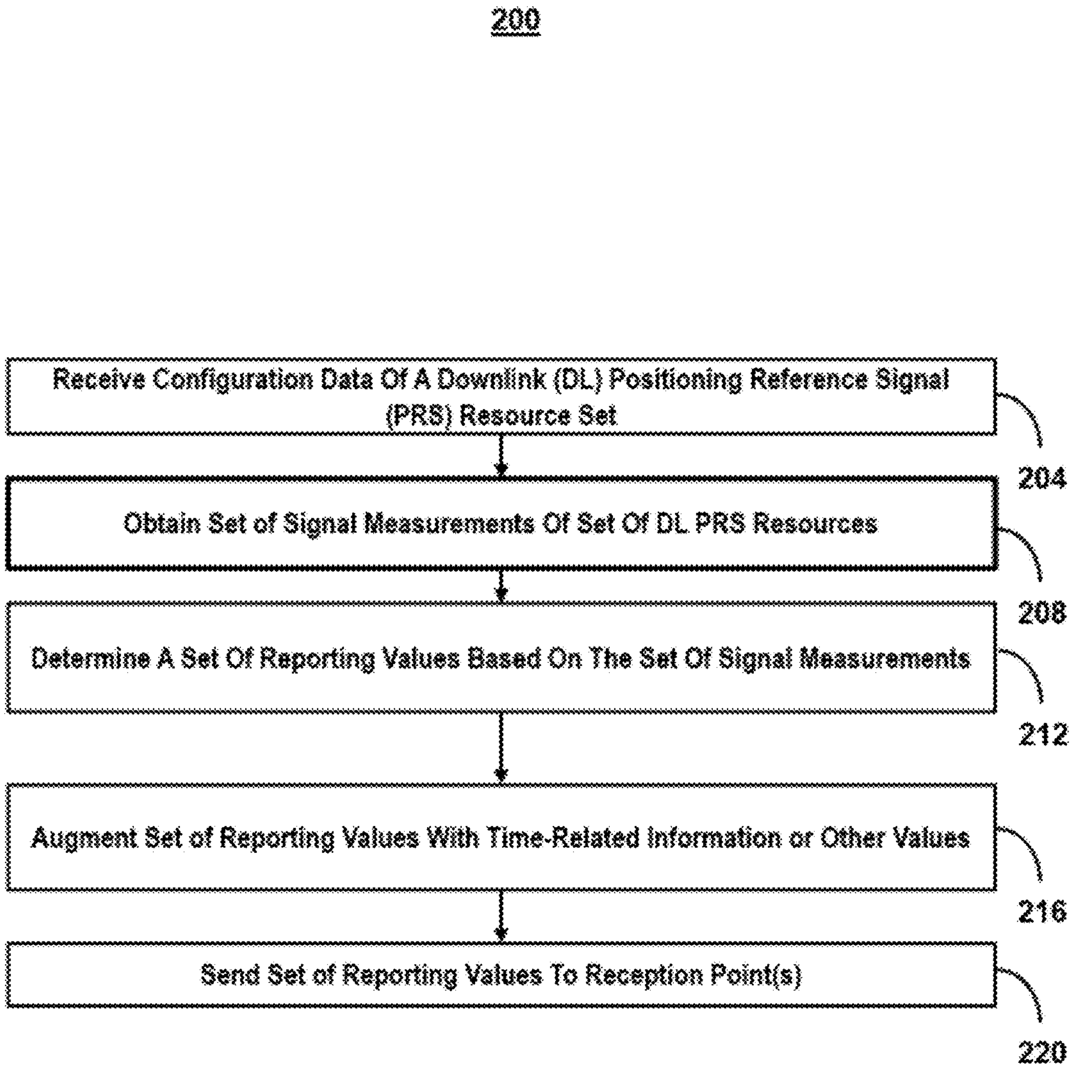
FIG. 2 shows a flowchart of a process to cause user equipment to report multiple power measurements from different beams of a transmission/reception point, in accordance with one or more embodiments.

FIG. 2 shows a flowchart of a process to cause user equipment to report multiple power measurements from different beams of a transmission/reception point, in accordance with one or more embodiments. The operations of any method presented in this disclosure are intended to be illustrative and non-limiting. It is contemplated that the operations or descriptions of FIG. 2 or FIG. 3 may be used with any other embodiment of this disclosure. In addition, the operations and descriptions described in relation to FIG. 2 or FIG. 3 may be done in alternative orders or in parallel to further the purposes of this disclosure. Each of these operations may be performed in any order, in parallel, or simultaneously to reduce lag or increase the speed of the system or method. In some embodiments, the methods may be accomplished with one or more additional operations not described or without one or more of the operations discussed. For example, some embodiments may perform operations of the flowchart 200 without performing operations indicated by block 216.

Operations of the flowchart 200 may begin at block 204. Some embodiments may receive configuration data of a downlink (DL) positioning reference signal (PRS) resource set, as indicated by block 204. In some embodiments, a UE may be provided with configuration data of DL PRS resources from a set of TRPs. Each TRP of the set of TRPs may transmit multiple DL PRS resources to the UE. The configuration data sent to a UE may be provided in various forms, such as the code represented in the section titled "NR-DL-PRS-Info" of 3GPP TS 137.355 V16.2.0, which is incorporated herein by reference. For example, a configuration file may identify a DL PRS resource set with the resource set identifier "NR-DL-PRS-ResourceSetID-r16." Furthermore, the configuration data may identify, define, or otherwise characterize the other parameters of an DL PRS resource set. For example, the configuration data may include a periodicity and a DL PRS resource set slot offset as encoded in the parameter "NR-DL-PRS-Periodicity-and-ResourceSetSlotOffset-r16."

Each respective DL PRS resource of the multiple DL PRS resources may be conveyed via a respective TRP transmit beam, where the respective beam and the respective DL PRS resource of the respective beam may be associated with a respective spatial transmission filter used to receive the DL PRS resource. For example, a TRP may provide configuration data to a UE, where the configuration data identifies and provides data for a first DL PRS resource, and where the first DL PRS resource is associated with a TRP transmit beam sent by the TRP. Furthermore, as described elsewhere in this disclosure, some embodiments may receive DL PRS resources that share a spatial transmission filter.

In some embodiments, the configuration data sent to a UE may indicate an association between a pair of DL PRS resources. The association between the pair of DL PRS resources may represent a spatial adjacency or another spatial association of the TRP transmit beams associated with the pair of DL PRS resources. For example, the configuration data may indicate a first DL PRS resource in association with a second DL PRS resource, where the first DL PRS resource may be associated with a first TRP transmit beam, and where the second DL PRS resource an associated with a second TRP transmit beam. The association of the DL PRS resource may reflect a spatial adjacency between two beams of a TRP.

In some embodiments, a UE may be provided with configuration data of a set of DL PRS resources. A DL PRS resource set identifier may identify each resource of the set of DL PRS resources. Additionally, each DL PRS resource of the DL PRS resource set may be identified by a DL PRS resource identifier. In some embodiments, configuration data for a first DL PRS resource may include associations with other DL PRS resources. The association provided by the configuration data may indicate that a second beam used to transmit information for the second DL PRS resource is adjacent to a first beam used to transmit information for the first DL PRS resource. As described elsewhere in this disclosure, this association may cause the UE to report measurements corresponding with the second DL PRS resource in response to a determination that the UE should report measurements corresponding with the first DL PRS resource. Furthermore, in some embodiments, the UE may be preconfigured with configuration data that specify associations between different DL PRS resources without requiring a new set of configuration data. For example, some embodiments may include an application, function, or other execution of program code operating on a UE that causes the UE to include configuration data for a TRP and send signal measurements of multiple beams of the TRP as described in this disclosure, where the configuration data was not sent by the TRP.

In some embodiments, configuration data for a first DL PRS resource set sent to a UE may associate the resource having an index value "n" (i.e., n-th entry) in a list of DL PRS resources and the resource having an index value "n+1" (i.e., (n+1)-th entry) in the list of DL PRS resources. As described elsewhere in this disclosure, the association may indicate that the DL PRS resource of the n-th entry in the list and the DL PRS resource of the (n+1)-th entry are carried by beams that are adjacent to each other in a spatial domain. After receiving the configuration data, if the UE reports a RSRP measurement of the DL PRS resource of the n-th entry in the list, the association indicated by the configuration data may cause the UE to also report the RSRP measurement of the DL PRS resource of the (n+1)-th entry. Similarly, if the UE reports the RSRP measurement of the DL PRS resource of the (n+1)-th entry in the list based on a determination that the RSRP measurement of the DL PRS resource of the (n+1)-th entry is greatest, the association indicated by the configuration data may cause the UE to report the RSRP measurement of the DL PRS resource of the n-th entry as well.

In some embodiments, the spatial adjacency of beams may not be reflected by consecutive index values. The relationship between different index values may vary between different antenna arrays and the index values assigned to the DL PRS resources transmitted by the arrays. For example, if a first DL PRS resource set contains a list of M DL PRS resources, the n-th entry in the list of DL PRS resources may be associated with the (n+1)-th entry, (n+N)-th entry and (n−N)-th entry in the list of DL PRS resources, where N may be a shift value. Such associations may reflect an array of antennas that are arranged such that the beams associated with the (n+1)-th entry, (n+N)-th entry and (n−N)-th entry are spatially adjacent with the beam associated with the n-th entry. In some embodiments, the value of N may be equal to a value greater than one, such as 2, 4, 8, 16, 32, or some other number greater than one. For example, a UE may be provided with configuration data indicating that M is equal 32, which may represent 32 different DL PRS resources, and that the configuration data may also indicate that a shift value N is equal to 8.

The configuration data sent to a UE may be presented in various forms and indicate associations between DL PRS resources that are consecutive with respect to their indices or not consecutive with respect to their indices. The associations between different DL PRS resources may vary between configuration data, where this variation may reflect different physical spatial arrangements of beams. As an example of the complexity a set of association between the DL PRS resources contained in a list of a DL PRS resource set, a configuration file may arrange the following associations:

1) The configuration data may indicate that a DL PRS resource indexed by an index value "1" is associated with a DL PRS resource indexed by an index value "2." The first DL PRS resource is also associated with a DL PRS resource indexed by an index value "9" based on a determination that "N+1=9."

2) The configuration data may further indicate that the DL PRS resource indexed by the index value "2" is associated with the first DL PRS. The second DL PRS resource is also associated with a DL PRS resource indexed by an index value "10" based on a determination that "N+2=10."

3) The configuration data may further indicate a set of associations for each DL PRS resource of a first subset of DL PRS resources indexed by the L, where L may be any integer greater than 2 and less than 8. For each resource of the first subset of DL PRS resources indexed by L, the program code may indicate that the resource is also linked to DL PRS resource indexed by the values (L−1), (L+1), and (L+8). For example, using these expressions, the DL PRS resource indexed by the index value "7" may be associated with the DL PRS indexed by the values "6," "8," and "15."

4) The configuration data may further indicate that the DL PRS resource indexed by the index value "8" is associated with a DL PRS indexed by the value "7." The DL PRS resource indexed by the index value "8" may also be associated with a DL PRS resource indexed by an index value "16" based on a determination that "N+8=16."

5) The configuration data may further indicate a set of associations for each DL PRS resource of a second subset of DL PRS resources indexed by the integer Q, where Q may be one of the integers 9 and 17. For each resource of the second subset of DL PRS resources indexed by Q, the program code may indicate that the resource is also linked to DL PRS resource indexed by the values (Q+1), (Q+8), and (Q−8). For example, using these expressions, the DL PRS resource indexed by the index value "9" may be associated with the DL PRS indexed by the values "1," "10," and "17."

6) The configuration data further indicates a set of associations for each DL PRS resource of a third subset of DL PRS resources indexed by the integer P, where P may be the integers 16 and 24. For each resource of the third subset of DL PRS resources indexed by P, the program code may indicate that the resource is also linked to DL PRS resource indexed by the values (P−1), (P+8), and (P−8). For example, using these expressions, the DL PRS resource indexed by the index value "24" may be associated with the DL PRS indexed by the values "23," "32," and "16."

7) The configuration data further indicates a set of associations for each DL PRS resource of a fourth subset of DL PRS resources indexed by J, where J may be any integer greater than nine and less than 16 or any integer greater than 17 and less than 24. For each resource of the fourth subset of DL PRS resources indexed by J, the program code may indicate that the resource is also linked to DL PRS resource indexed by the values (J−1), (J+1), (J+8), and (J−8).

8) The configuration data further indicates that the DL PRS resource indexed by the index value "25" is associated with a DL PRS indexed by the value "26." The DL PRS resource indexed by the index value "25" may also be associated with a DL PRS resource indexed by an index value "17." The DL PRS resource indexed by the index value "25" is associated with a DL PRS indexed by the value "26." The DL PRS resource indexed by the index value "25" may also be associated with a DL PRS resource indexed by an index value "17."

9) The configuration data further indicates that the DL PRS resource indexed by the index value "32" is associated with a DL PRS indexed by the value "31" and the index value "24."

10) The configuration data also indicates a set of associations for each DL PRS resource of a fifth subset of DL PRS resources indexed by K, where K may be any integer greater than 25 and less than 31. For each resource of the fifth subset of DL PRS resources indexed by K, the program code may indicate that the resource is also linked to DL PRS resource indexed by the values (K−1), (K+1), and (K−8).

As shown in the illustrative and non-limiting example above, different antenna array designs may cause a UE to be configured with different antennas. Other embodiments may include simpler or more complex associations between DL PRS resources based on simpler or more complex antenna arrangements. Furthermore, while aspects of this disclosure indicate that associations between DL PRS resources indicate a spatial adjacency between beams, some embodiments may provide a UE with other associations between DL PRS resources based on other types of spatial relationships. For example, some embodiments may store configuration data in a UE that indicates an association between a first and second DL PRS resource, where the first and second DL PRS resources are transmitted via first and second transmit beams, and where the first transmit beam has a spatial association with the second transmit beam other than being adjacent beams. For example, the first transmit beam may be a second or third nearest neighbor of the second transmit beam.

In some embodiments, the UE may receive multiple DL PRS resource sets. For example, some embodiments may receive a first DL PRS resource set via first configuration data that identifies the first DL PRS resource set as a whole with a set identifier. The first configuration data may further identify each respective DL PRS resource of the first DL PRS resource set with a respective resource identifier. The first configuration may further indicate associations between the first DL PRS resource set. Some embodiments may concurrently or later receive a second DL PRS resource set via second configuration data. The second configuration data may identify the second DL PRS resource set as a whole with a second set identifier. The second configuration data may also identify each respective DL PRS resource of the second DL PRS resource set with a respective resource identifier. The second configuration data may further indicate associations between resources of the second DL PRS resource set. After receiving both first and second configuration data, the UE may concurrently perform operations described elsewhere in this disclosure to report RSRPs of DL PRS resources of the first and second DL PRS resource sets.

Some embodiments may determine an association between DL PRS resources based on an obtained antenna arrangement of a TRP. For example, some embodiments may be provided with a set of values indicating a physical structure of the TRP. Some embodiments may then use an image recognition model or another learning model to determine the spatial associations between different antennas and generate a map of spatial adjacencies between beams projected by the antennas. Alternatively, or in addition, some embodiments may obtain the map of spatial adjacencies directly, such as obtaining an array of values representing associations between transmit beams or their corresponding DL PRS resources. Some embodiments may generate the set of DL PRS resource associations based on the spatial adjacencies and generate or otherwise update configuration data using a text generation program based on the mapped spatial adjacencies between beams. The generated set of DL PRS resource associations may indicate a set of DL PRS resource associations between DL PRS resources of a DL PRS resource set sent from the TRP.

Some embodiments may obtain a set of signal measurements of the set of DL PRS resources, as indicated by block 208. The set of signal measurements may include RSRP measurements corresponding with the set of DL PRS resources identified by the configuration data. In some embodiments, a UE may obtain RSRP measurements of some or all of the associated DL PRS resources transmitted via a set of TRP transmit beams, where the set of TRP transmit beams may be sent from a single TRP or from multiple TRPs. Some embodiments may perform measurements in accordance with physical layer procedures described in 3GPP TS 38.215 V16.0.0, the entirety of which is incorporated herein by reference. Obtaining an RSRP measurement may include obtaining one or more types of RSRP measurements. For example, some embodiments may obtain a synchronization signal RSRP measurement, a CSI RSRP measurement, or the like.

Some embodiments may perform other measurements in addition to or alternative to the RSRP measurements. Such measurements may include a Received Signal Strength Indicator (RSSI) measurement, a Reference Signal Received Quality (RSRQ) measurement, signal-to-noise and interference ratio (SINR), or the like. For example, some embodiments may obtain SS-RSSI measurements, CSI-RSSI measurements, SS-RSRQ measurement, CSI-RSRQ measurement, SS-SINR, or CSI-SINR measurement.

When receiving and measuring data via DL PRS resources, some embodiments may use channels and modulation parameters in accordance with 3GPP TS 38.211 V16.0.0, the entirety of which is incorporated herein by reference. Similarly, some embodiments may perform multiplexing and channel coding operations in accordance with 3GPP TS 38.212 V16.0.0, the entirety of which is incorporated herein by reference. Furthermore, some embodiments may use physical layer procedures for control and data management in accordance with 3GPP TS 38.213 V16.0.0 and 3GPP TS 38.214 V16.0.0, each of which is incorporated herein by reference in their respective entirety. In addition, some embodiments may access the UE based on medium access control protocol specifications described in 3GPP TS 38.321 V16.0.0, the entirety of which is incorporated herein by reference. Furthermore, some embodiments may perform communication operations in accordance with radio resource control protocol specifications described in 3GPP TS 38.331 V16.0.0, the entirety of which is incorporated by reference.

Some embodiments may determine a set of reporting values based on the measured set of reference signal received power measurements of the set of DL PRS resources, as indicated by block 212. In some embodiments, the set of reporting values may be a subset of the RSRP measurements. The configuration data sent to a UE may cause the UE to report RSRP measurements of a selected subset of the DL PRS resources, where the selected subset may be associated with each other based on the configuration data. For example, the UE may determine that the primary RSRP to report corresponds with a first DL PRS resource corresponding with a first transmit beam sent from a TRP. The configuration data sent to the UE by the TRP may indicate that the first DL PRS resource is associated with a second DL PRS resource sent to the UE via a second transmit beam. The configuration data may further associate the first DL PRS resource with a third DL PRS resource carried by a third transmit beam sent from the TRP. In some embodiments, the second transmit beam and the third transmit beam are both adjacent transmit beams of the first transmit beam. The configuration data may then cause the UE to send RSRP measurements of the second and third DL PRS resources to the TRP or another signal-receiving device.

Alternatively, or in addition, some embodiments may include a first measurement and a value representing a difference from the first measurement in a set of reporting values to be transmitted from a UE. For example, some embodiments may send an RSRP measurement of a first DL PRS resource and an RSRP measurement difference of the first DL PRS resource. In some embodiments, the sum of the RSRP measurement of the first DL PRS resource to the RSRP measurement difference is equal to the RSRP measurement of an adjacent DL PRS resource. Furthermore, some embodiments may add values based on the signal measurements to a set of reporting values instead of sending signal measurements, such as an integer or categorical value representing intervals or ranges corresponding with an RSRP measurement. For example, some embodiments may cause a UE to send "3" for a first DL PRS resource based on a determination that an RSRP measurement for the first DL PRS resource is within an RSRP interval identified by the category value "3."

Furthermore, some embodiments may include signal measurements other than RSRP measurements in the set of reporting values. Such other signal measurements may include RSSI, SINR, RSRQ, or the like. For example, some embodiments may add a first RSRQ for a DL PRS resource to a set of reporting values based on a determination that the first RSRQ is greatest for a particular DL PRS resource. Based on a determination that the first DL PRS resource is associated with a second DL PRS resource by configuration data, some embodiments may then add a second RSRQ of the second DL PRS resource to the set of reporting values to be transmitted by the UE.

Some embodiments may augment the set of reporting values with time-related information or other values, as indicated by block 216. The additional values may include time-related values, measurement-related values, etc. For example, some embodiments may send a time-related value such as a timestamp from a UE, where the timestamp is associated with the measurements of a first and second RSRP measurements by the UE. In some embodiments, configuration data sent to the UE may cause the UE to include timing measurement information for a DL PRS resource. As described elsewhere in this disclosure, a TRP or another computer system may use the timing information reported by the UE to determine a position of the UE or increase the accuracy of the position determination. Furthermore, some embodiments may cause a UE to add a UE Rx-Tx time difference measured for a DL PRS resource to the set of reporting values. In some embodiments, a computer system may use the UE Rx-Tx time difference to determine a distance distribution between a UE and the TRP or another TRP. Alternatively, or in addition, some embodiments may cause a UE to add a DL Reference Signal Time Difference (RSTD) measurement to a set of reporting values of the UE. In some embodiments, the RSTD may be measured for a first DL PRS resource relative to a reference DL PRS resource.

Some embodiments may determine a time of arrival measurement for a DL PRS resource, where the time of arrival measurement may be an objective measurement. Alternatively, some embodiments may determine a differential time of arrival measurement for a DL PRS resource, where the differential time of arrival is determined relative to the timing measurement information of another DL PRS resource within the same DL PRS resource set. For example, some embodiments may include a differential time of arrival for a first DL PRS resource in a set of reporting values. In some embodiments, the differential time of arrival equals the time difference between when the first DL PRS resource is received when a second DL PRS resource is received. The relationship between the first and second DL PRS resource may be such that both the first and second DL PRS resource are part of the same DL PRS resource set determined in configuration data. Alternatively, or in addition, the relationship between the first and second DL PRS resource may be such that both are transmitted via transmit beams of the same TRP. As an example of the above, some embodiments may receive configuration data such as that represented in Table 1, which includes higher layer parameter specifications that cause the UE to transmit time information concurrently with RSRP information.

TABLE 1

| Ln | Instruction |
|---|---|
| 1 | -- ASN1START |
| 2 | NR-DL-Angle-of-Departure-SignalMeasurementInformation-r16 ::= SEQUENCE { |
| 3 | nr-DL-Angle-of-Departure-MeasList-r16 NR-DL-Angle-of-Departure-MeasList-r16, |
| 4 | ... |
| 5 | } |
| 6 | NR-DL-Angle-of-Departure-MeasList-r16 ::= SEQUENCE (SIZE(1..nrMaxTransmit/Receive Points-r16)) OF NR-DL-Angle-of-Departure-MeasElement-r16 |
| 7 | NR-DL-Angle-of-Departure-MeasElement-r16 ::= SEQUENCE { |
| 8 | dl-PRS-ID-r16 INTEGER (0..255), |
| 9 | nr-PhysCellID-r16 NR-PhysCellID-r16 OPTIONAL, |
| 10 | nr-CellGlobalID-r16 NCGI-r15 OPTIONAL, |
| 11 | nr-ARFCN-r16 ARFCN-ValueNR-r15 OPTIONAL, |
| 12 | nr-DL-PRS-ResourceID-r16 NR-DL-PRS-ResourceID-r16 OPTIONAL, |
| 13 | nr-DL-PRS-ResourceSetID-r16 NR-DL-PRS-ResourceSetID-r16 OPTIONAL, |
| 14 | nr-TimeStamp-r16 NR-TimeStamp-r16, |
| 15 | nr-DL-PRS-RSRP-Result-r16 INTEGER (0..126), |
| 16 | nr-DL-PRS-RxBeamIndex-r16 INTEGER (1..8) OPTIONAL, -- Cond SameRx |
| 17 | nr-DL-Angle-of-Departure-AdditionalMeasurements-r16 |
| 18 | NR-DL-Angle-of-Departure-AdditionalMeasurements-r16 OPTIONAL, |
| 19 | ...} |
| 20 | NR-DL-Angle-of-Departure-AdditionalMeasurements-r16 ::= SEQUENCE (SIZE (1..7)) OF |
| 21 | NR-DL-Angle-of-Departure-AdditionalMeasurementElement-r16 |
| 22 | NR-DL-Angle-of-Departure-AdditionalMeasurementElement-r16 ::= SEQUENCE { |

TABLE 1-continued

| Ln | Instruction |
|---|---|
| 23 | nr-DL-PRS-ResourceID-r16 NR-DL-PRS-ResourceID-r16 OPTIONAL, |
| 24 | nr-DL-PRS-ResourceSetID-r16 NR-DL-PRS-ResourceSetID-r16 OPTIONAL, |
| 25 | nr-TimeStamp-r16 NR-TimeStamp-r16, |
| 26 | nr-DL-PRS-RSRP-ResultDiff-r16 INTEGER (0..30), |
| 27 | nr-DL-PRS-RxBeamIndex-r16 INTEGER (1..8) OPTIONAL, -- Cond SameRx |
| 28 | nr-DL-PRS-relativeToA INTEGER. |
| 29 | ...} |
| 30 | -- ASN1STOP |

As shown by Table 1, the configuration data may include parameters that cause a UE to measure or transmit time-related information. For example, the parameter "nr-DL-PRS-relativeToA" may be a relative time of arrival measured from a first DL PRS resource reported in "NR-DL-Angle-of-Departure-AdditionalMeasurementElement," and the parameter "nr-DL-PRS-relativeToA" may be reported relative to a time of arrival measurement of a second DL PRS resource reported in "NR-DL-Angle-of-Departure-MeasElement." By reporting these time-related values, some embodiments may provide measurements that may increase the accuracy of UE position estimates.

Some embodiments may augment a set of reporting values with values other than time-related values. Such values may include an indication of a shared spatial domain filter between different RSRPs, a GPS geolocation, an estimated UE velocity, or the like. For example, some embodiments may receive configuration data that causes a UE to add an indication that a first RSRP and second RSRP are obtained with a same spatial domain filter and an identifier of the spatial domain filter to a set of reporting values.

Some embodiments may transmit the set of reporting values to a set of reception points, as indicated by block 220. In some embodiments, the set of reception points may include a TRP that provided configuration data to a UE. For example, a TRP that provided configuration data to a UE that indicated an association between two DL PRS resources may then receive RSRP measurements from the UE of the two DL PRS resources. Alternatively, or in addition, some embodiments may send the set of reporting values to a TRP other than the TRP that provided the configuration data or to another data-receiving device. After receiving signal measurements from a UE, a computer system may then apply a positioning algorithm (e.g., an angle of departure algorithm) to determine the position of the UE based on multiple signal measurements corresponding with different beams transmitted by the UE. For example, a computing device of the TRP may determine a position of a UE based on RSRP values transmitted by the UE, where the RSRP measurements are measurements of the DL PRS resources sent by the TRP.

As described elsewhere in this disclosure, the set of reporting values may include values other than RSRP values, such as time-related values or indications that different DL PRS resources were received with a shared spatial domain filter. For example, some embodiments may cause a UE to report a set of RSRP of adjacent DL PRS resources and further report a set of time of arrival measurements or relative time of arrival measurements to a TRP. By using additional time-related information or other information, some embodiments may increase the accuracy of time of departure positioning estimates of the UE.

Figure 3:
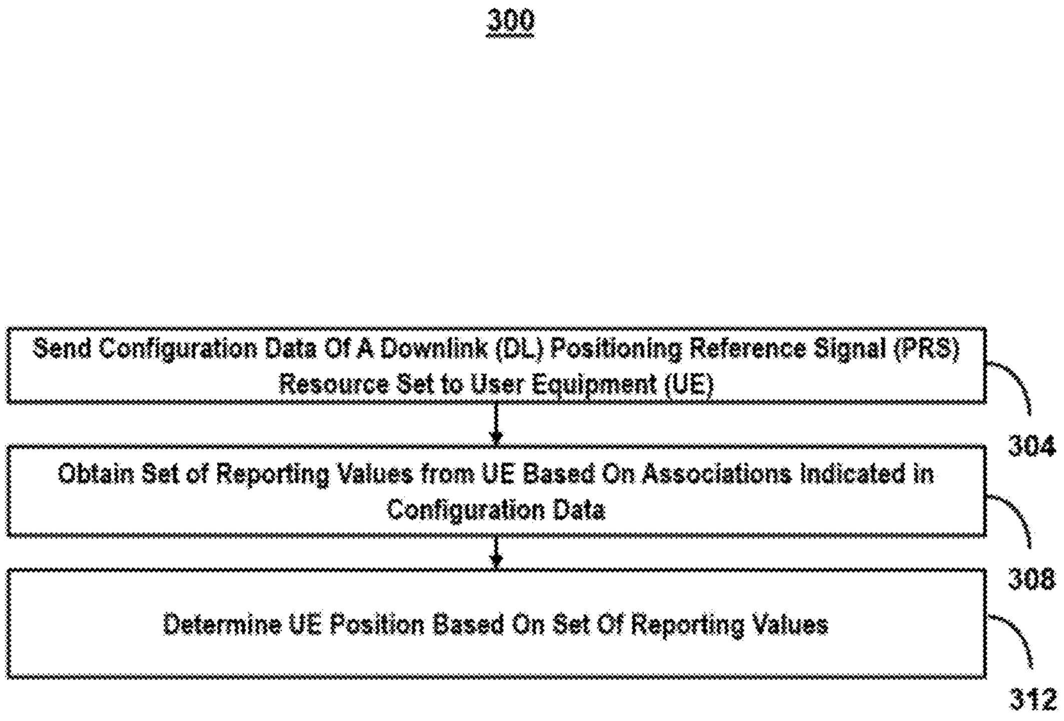
FIG. 3 shows a flowchart of a process to send configuration data to user equipment and determine a position of the user equipment based on the configuration data, in accordance with one or more embodiments.

FIG. 3 shows a flowchart of a process to send configuration data to user equipment and determine a position of the user equipment based on the configuration data, in accordance with one or more embodiments. Operations of the flowchart 300 may begin at block 304. Some embodiments may send configuration data of a downlink (DL) positioning reference signal (PRS) resource set to user equipment (UE), as indicated by block 304. The configuration data may include data described in block 204 or other configuration data described in this disclosure. For example, a TRP capable of sending 32 different transmit beams may send configuration data to a UE that indicates associations between DL PRS resources. The associations between DL PRS resources may indicate spatial relations between the transmit beams, such as the spatial adjacency of the transmit beams.

Some embodiments may receive signal measurements based on the associations indicated in the configuration data, as indicated by block 308. As described elsewhere in this disclosure, the associations indicated by configuration data sent or stored on a UE may cause the UE to send signal measurements back to the TRP. Some embodiments may receive signal measurements such as those described in the flowchart 200 or elsewhere in this disclosure. For example, some embodiments may receive a first RSRP value of a first DL PRS resource and a second RSRP value of a second DL PRS resource from a UE, where the first and second DL PRS resources are associated in a configuration file sent to the UE and are adjacent DL PRS resources.

Some embodiments may determine a UE position based on the set of reporting values, as indicated by block 312. As described elsewhere in this disclosure, some embodiments may determine the position of a UE relative to a TRP based on the UE's signal measurements of multiple transmit beams sent from the TRP. For example, some embodiments may use an angle of departure algorithm to determine the position of a UE based on a first RSRP measurement and a second RSRP measurement. The first RSRP measurement may be a signal measurement of a first beam indicated to have provided the greatest RSRP value to the UE, and the second RSRP value may be a signal measurement of a second beam that is adjacent to the first beam. Based on the RSRP values and a known configuration of the antennas transmitting the first and second transmit beams, some embodiments may determine a position of the UE.

Figure 4:
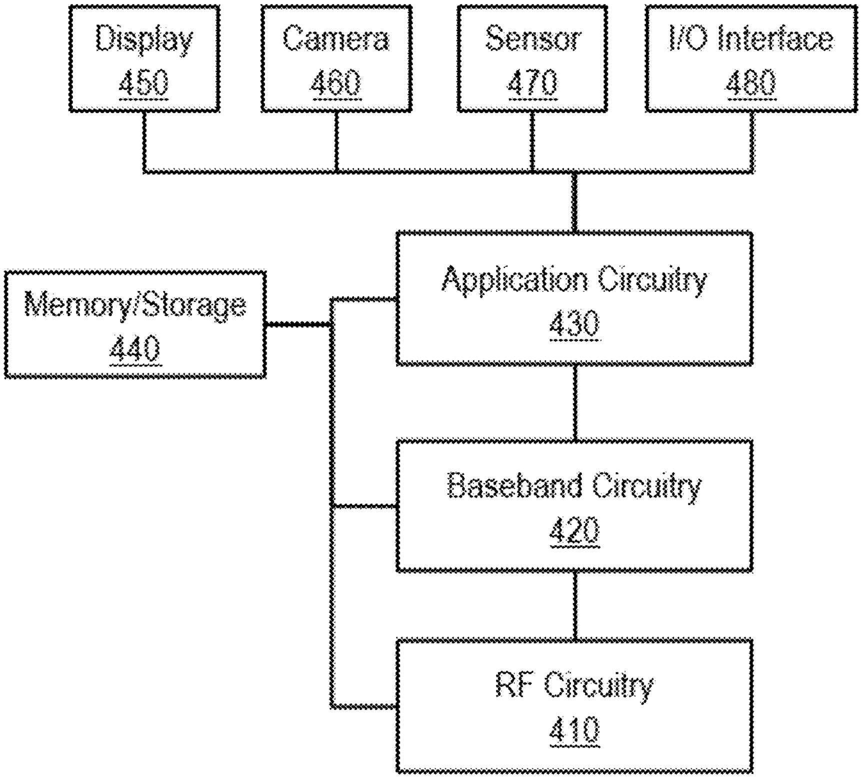
FIG. 4 is a block diagram of a system for wireless communication, in accordance with one or more embodiments.

FIG. 4 is a block diagram of a system for wireless communication, in accordance with one or more embodiments. FIG. 4 is a block diagram of an example system 400 for wireless communication according to an embodiment of the present disclosure. Embodiments described herein may be implemented into the system using any suitably configured hardware or software. FIG. 3 illustrates the system 400 including a radio frequency (RF) circuitry 410, a baseband circuitry 420, an application circuitry 430, a memory/storage 440, a display 450, a camera 460, a sensor 470, and an input/output (I/O) interface 480, coupled with each other at least as illustrated. For example, the system 400 may use the RF circuitry 410 to obtain DL PRS resource information via a transmit beam transmitted by a TRP.

The application circuitry 430 may include a circuitry, such as, but not limited to, one or more processing devices (e.g., a digital processor, a single-core processor, a multi-core processor, an analog processor, a digital circuit designed to process information, an analog circuit designed to process information, a state machine, or other mechanisms for electronically processing information). The processors may include any combinations of general-purpose processors and dedicated processors, such as graphics processors and application processors. The processors may be coupled with the memory/storage 440 and configured to execute instructions stored in the memory/storage 440 to enable various applications or operating systems running on the system. The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods. For example, it should be noted that any of the computer devices of a UE discussed in this disclosure could be used to perform one or more of the operations described in of the flowchart 200. Furthermore, any computer device of a TRP discussed in this disclosure could be used to perform one or more of the operations in of the flowchart 300.

The baseband circuitry 420 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 420 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 410 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 410 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, or the application circuitry. As used herein, "circuitry" may refer to, be part of, or include an Application Specific Integrated Circuit (ASIC), an electronic circuit, a processor (shared, dedicated, or group), or a memory (shared, dedicated, or group) that execute one or more software or firmware programs, a combinational logic circuit, or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, or the memory/storage may be implemented together on a system on a chip (SOC).

The memory/storage 440 may be storage media used to load and store data or instructions, for example, for system. The memory/storage for one embodiment may include any combination of suitable volatile memory, such as dynamic random access memory (DRAM), or non-volatile memory, such as flash memory. Each of the devices described in this disclosure may include electronic storages such as the memory/storage 440 or other types of electronic storage. The electronic storages may include non-transitory storage media that electronically stores information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. The electronic storages may include one or more virtual storage resources (e.g., cloud storage, a virtual private network, or other virtual storage resources). An electronic storage may store software algorithms, information determined by the processors, information obtained from servers, information obtained from client devices, or other information that enables the functionality as described herein.

In various embodiments, the I/O interface 480 may include one or more user interfaces designed to enable user interaction with the system or peripheral component interfaces designed to enable peripheral component interaction with the system. With respect to the components of computer devices described in this disclosure, each of these devices may receive content and data via input/output (i.e., "I/O") paths. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

Devices described in this disclosure may also include processors or control circuitry to send and receive commands, requests, and other suitable data using the 1/O paths. The control circuitry may comprise any suitable processing, storage, or input/output circuitry. Further, some or all of the computer devices described in this disclosure may include a user input interface or user output interface (e.g., a display) for use in receiving and displaying data. In some embodiments, a display such as a touchscreen may also act as user input interfaces. It should be noted that in some embodiments, one or more devices described in this disclosure may have neither user input interface nor displays and may instead receive and display content using another device (e.g., a dedicated display device such as a computer screen or a dedicated input device such as a remote control, mouse, voice input, etc.). Additionally, one or more of the devices described in this disclosure may run an application (or another suitable program) that performs one or more operations described in this disclosure.

In various embodiments, the sensor 470 may include one or more sensing devices to determine environmental conditions or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry or RF circuitry to communicate with components of a positioning network, e.g., a global positioning system (GPS) satellite.

In various embodiments, the display 450 may include a display, such as a liquid crystal display and a touch screen display. In various embodiments, the system 400 may be a mobile computing device such as, but not limited to, a laptop computing device, a tablet computing device, a netbook, an ultrabook, a smartphone, etc. In various embodiments, system may have more or less components, or different architectures. Where appropriate, methods described herein may be implemented as a computer program. The computer program may be stored on a storage medium, such as a non-transitory storage medium.

In some embodiments, the various devices and subsystems illustrated in FIG. 1 or FIG. 4 may include one or more computer devices that are programmed to perform the functions described herein. The computing devices may include one or more electronic storages one or more physical processors programmed with one or more computer program instructions, or other components. The computing devices may include communication lines or ports to enable the exchange of information with a set of networks or other computing platforms via wireless techniques. The network may include the Internet, a mobile phone network, a mobile voice or data network (e.g., a 5G or LTE network), or other types of communications networks or combinations of communications networks. The computing devices may include additional communication paths linking a plurality of hardware, software, or firmware components operating together.

The processors may be programmed to provide information processing capabilities in the computing devices. As such, the processors may include one or more of a digital processor, an analog processor, a digital circuit designed to process information, an analog circuit designed to process information, a state machine, or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions by software; hardware; firmware; some combination of software, hardware, or firmware; or other mechanisms for configuring processing capabilities on the processors.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring).

Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. As used in this disclosure, a "set" of items may describe a single item or a plurality of items.

Enumerated Embodiments

The present techniques will be better understood with reference to the following enumerated embodiments:

1. A method comprising receiving, at a user equipment, configuration data of a downlink positioning reference signal resource set, wherein the configuration data indicates an association between a first downlink positioning reference signal resource and a second downlink positioning reference signal resource, obtaining a first reference signal received power measurement of the first downlink positioning reference signal resource and a second reference signal received power measurement of the second downlink positioning reference signal resource, and transmitting the first reference signal received power measurement and the second reference signal received power measurement to a transmission/reception point based on the association between the first downlink positioning reference signal resource and the second downlink positioning reference signal resource.

2. A method comprising receiving, at a user equipment, configuration data of a downlink positioning reference signal resource set, wherein the configuration data indicates an association between a first downlink positioning reference signal resource and a second downlink positioning reference signal resource, obtaining a first signal measurement of the first downlink positioning reference signal resource and a second signal measurement of the second downlink positioning reference signal resource, determining a value based on the second signal measurement, and transmitting the first signal measurement and the value to a transmission/reception point based on the association between the first downlink positioning reference signal resource and the second downlink positioning reference signal resource.

3. A method comprising receiving, at a user equipment, configuration data of a downlink positioning reference signal resource set, wherein the configuration data indicates an association between a first downlink positioning reference signal resource and a second downlink positioning reference signal resource, obtaining a first signal measurement of the first downlink positioning reference signal resource and a second signal measurement of the second downlink positioning reference signal resource, determining a first value based on the first signal measurement, determining a second value based on the second signal measurement, and transmitting the first value and the second value to a transmission/reception point based on the association between the first downlink positioning reference signal resource and the second downlink positioning reference signal resource.

4. The method of any of embodiments 1-3, wherein the first value is the first signal measurement.

5. The method of any of embodiments 1-4, wherein the second value is the second signal measurement.

6. The method of any of embodiments 1-5, wherein the first signal measurement is a first reference signal received power measurement.

7. The method of any of embodiments 1-6, wherein the second signal measurement is a second reference signal received power measurement.

8. The method of any of embodiments 1-7, further comprising determining a user equipment Rx-Tx time difference of the first downlink positioning reference signal resource, and transmitting the user equipment Rx-Tx time difference.

9. The method of any of embodiments 1-8, wherein determining the first value comprises determining a category value based on the first signal measurement, and determining the second value comprises determining a category value based on the second signal measurement.

10. The method of any of embodiments 1-9, wherein the first signal measurement is at least one of a reference signal received power (RSRP) measurement, a received signal strength indicator (RSSI), a reference signal received quality (RSRQ), or a signal-to-noise and interference ratio (SINR).

11. The method of any of embodiments 1-10, wherein the second signal measurement is at least one of a reference signal received power (RSRP) measurement, a received signal strength indicator (RSSI), a reference signal received quality (RSRQ), or a signal-to-noise and interference ratio (SINR).

12. The method of any of embodiments 1-11, further comprising determining an additional signal value associated with the first positioning reference signal resource, wherein the additional signal value comprises at least one of a received signal strength indicator (RSSI), a reference signal received quality (RSRQ), or a signal-to-noise and interference ratio (SINR), and sending the additional signal value to the transmission/reception point.

13. The method of any of embodiments 1-12, wherein the association between the first downlink positioning reference signal resource and the second downlink positioning reference signal resource indicates that the first beam is adjacent to the second beam on the transmission/reception point.

14. The method of any of embodiments 1-13, further comprising obtaining an antenna arrangement of the transmission/reception point, wherein the antenna arrangement indicates spatial adjacencies of transmit beams, determining a set of downlink positioning reference signal resource associations based on the spatial adjacencies of transmit beams, and updating the configuration data based on the set of downlink positioning reference signal resource associations.

15. The method of any of embodiments 1-14, wherein the configuration data indicates the association between the first downlink positioning reference signal resource and the second downlink positioning reference signal resource by shifting an index value of the first downlink positioning reference signal resource by 1.

16. The method of any of embodiments 1-15, wherein the configuration data comprises a shift value, wherein the association between the first downlink positioning reference signal resource and the second downlink positioning reference signal resource is represented by the shift value, and wherein the shift value is an integer greater than 1.

17. The method of any of embodiments 1-16, wherein obtaining the first reference signal received power measurement comprises obtaining the first reference signal received power measurement and a third reference signal received power measurement with a same spatial domain filter.

18. The method of any of embodiments 1-17, wherein the first reference signal received power measurement and the second reference signal received power measurement are associated with a same timestamp.

19. The method of any of embodiments 1-18, further comprising sending a time of arrival measurement of the first downlink positioning reference signal resource to the transmission/reception point.

20. The method of any of embodiments 1-19, further comprising sending a differential time of arrival of the second downlink positioning reference signal resource to the transmission/reception point, wherein the differential time of arrival is equal to a difference between the time of arrival of the first downlink positioning reference signal resource and a time of arrival of the second downlink positioning reference signal resource.

21. The method of any of embodiments 1-20, further comprising sending a Reference Signal Time Difference of the first downlink positioning reference signal resource to the transmission/reception point.

22. The method of any of embodiments 1-21, wherein determining the value comprises setting the value as equal to the second signal measurement.

23. The method of any of embodiments 1-22, wherein determining the value comprises setting the value as equal to a difference between the first signal measurement and the second signal measurement.

24. The method of any of embodiments 1-23, wherein the first downlink positioning reference signal resource is communicated to the user equipment via a first beam of a transmission/reception point, the second downlink positioning reference signal resource is communicated to the user equipment via a second beam of the transmission/reception point, and the association between the first downlink positioning reference signal resource and the second downlink positioning reference signal resource indicates that the first beam is adjacent to the second beam on the transmission/reception point.

25. One or more tangible, non-transitory, machine-readable media storing instructions that, when executed by one or more processors, effectuation operations comprising those of any of embodiments 1-24.

25. A system comprising: one or more processors; and memory storing computer program instructions that, when executed by the one or more processors, cause the one or more processors to effectuate operations comprising those of any of embodiments 1-24.

I claim:

1. A method for increasing an accuracy of position estimation, performed by a user equipment and comprising:

receiving configuration data of a downlink positioning reference signal resource set, wherein the configuration data indicates an association between a first downlink positioning reference signal resource and a second downlink positioning reference signal resource; and obtaining a first reference signal received power measurement of the first downlink positioning reference signal resource and a second reference signal received power measurement of the second downlink positioning reference signal resource; and wherein the association between the first downlink positioning reference signal resource and the second downlink positioning reference signal resource indicated by the configuration data causes the user equipment to report the second reference signal received power measurement of the second downlink positioning reference signal resource to a transmission/reception point in response to a determination that the user equipment should report the first reference signal received power measurement of the first downlink positioning reference signal resource to the transmission/reception point, and if the user equipment transmits the first reference signal received power measurement, the user equipment shall also transmit the second reference signal received power measurement to a transmission/reception point based on the association between the first downlink positioning reference signal resource and the second downlink positioning reference signal resource.

2. The method of claim 1, wherein:

the first downlink positioning reference signal resource is communicated to the user equipment via a first beam of the transmission/reception point;

the second downlink positioning reference signal resource is communicated to the user equipment via a second beam of the transmission/reception point; and the association between the first downlink positioning reference signal resource and the second downlink positioning reference signal resource indicates that the first beam is adjacent to the second beam on the transmission/reception point.

3. The method of claim 1, further comprising:

obtaining an antenna arrangement of the transmission/reception point, wherein the antenna arrangement indicates spatial adjacencies of transmit beams;

determining a set of downlink positioning reference signal resource associations based on the spatial adjacencies of transmit beams; and updating the configuration data based on the set of downlink positioning reference signal resource associations.

4. The method of claim 1, wherein the configuration data indicates the association between the first downlink positioning reference signal resource and the second downlink positioning reference signal resource by shifting an index value of the first downlink positioning reference signal resource by 1.

5. The method of claim 1, wherein the configuration data comprises a shift value, wherein the association between the first downlink positioning reference signal resource and the second downlink positioning reference signal resource is represented by the shift value, and wherein the shift value is an integer greater than 1.

6. The method of claim 1, wherein obtaining the first reference signal received power measurement comprises obtaining the first reference signal received power measurement and a third reference signal received power measurement with a same spatial domain filter.

7. The method of claim 1, wherein the first reference signal received power measurement and the second reference signal received power measurement are associated with a same timestamp.

8. A non-transitory computer-readable storage medium storing program code that, when executed by a computer system, causes the computer system to perform operations comprising:

receiving, at a user equipment, configuration data of a downlink positioning reference signal resource set, wherein the configuration data indicates an association between a first downlink positioning reference signal resource and a second downlink positioning reference signal resource;

obtaining a first signal measurement of the first downlink positioning reference signal resource and a second signal measurement of the second downlink positioning reference signal resource;

determining a first value based on the first signal measurement; and determining a second value based on the second signal measurement;

wherein the association between the first downlink positioning reference signal resource and the second downlink positioning reference signal resource indicated by the configuration data causes the user equipment to report the second value to a transmission/reception point in response to a determination that the user equipment should report the first value to the transmission/reception point, and if the user equipment transmits the first value, the user equipment shall also transmit the second value to a transmission/reception point based on the association between the first downlink positioning reference signal resource and the second downlink positioning reference signal resource.

9. The non-transitory computer-readable storage medium of claim 8, wherein the operations further comprise:

determining a user equipment Rx-Tx time difference of the first downlink positioning reference signal resource; and transmitting the user equipment Rx-Tx time difference.

10. The non-transitory computer-readable storage medium of claim 8, wherein: determining the first value comprises determining a category value based on the first signal measurement; and determining the second value comprises determining a category value based on the second signal measurement.

11. The non-transitory computer-readable storage medium of claim 8, wherein the first signal measurement is a reference signal received power measurement.

12. The non-transitory computer-readable storage medium of claim 8, wherein the operations further comprise: determining an additional signal value associated with the first downlink positioning reference signal resource, wherein the additional signal value comprises at least one of a received signal strength indicator, a reference signal received quality, or a signal-to-noise and interference ratio; and sending the additional signal value to the transmission/reception point.

13. A method for increasing an accuracy of position estimation, performed by a transmission/reception point and comprising:

transmitting, to a user equipment, configuration data of a downlink positioning reference signal resource set, wherein the configuration data indicates an association between a first downlink positioning reference signal resource and a second downlink positioning reference signal resource, the first downlink positioning reference signal resource is used for the user equipment to obtain a first reference signal received power measurement of the first downlink positioning reference signal resource, and the second downlink positioning reference signal resource is used for the user equipment to obtain a second reference signal received power measurement of the second downlink positioning reference signal resource;

wherein the association between the first downlink positioning reference signal resource and the second downlink positioning reference signal resource indicated by the configuration data causes the user equipment to report the second reference signal received power measurement of the second downlink positioning reference signal resource to the transmission/reception point in response to a determination that the user equipment should report the first reference signal received power measurement of the first downlink positioning reference signal resource to the transmission/reception point, and if the transmission/reception point receives the first reference signal received power measurement, the transmission/reception point shall also receive the second reference signal received power measurement from the user equipment based on the association between the first downlink positioning reference signal resource and the second downlink positioning reference signal resource.

14. The method of claim 13, wherein:

the first downlink positioning reference signal resource is communicated to the user equipment via a first beam of the transmission/reception point;

the second downlink positioning reference signal resource is communicated to the user equipment via a second beam of the transmission/reception point; and the association between the first downlink positioning reference signal resource and the second downlink positioning reference signal resource indicates that the first beam is adjacent to the second beam on the transmission/reception point.

15. The method of claim 13, wherein the configuration data indicates the association between the first downlink positioning reference signal resource and the second downlink positioning reference signal resource by shifting an index value of the first downlink positioning reference signal resource by 1.

16. The method of claim 13, wherein the configuration data comprises a shift value, wherein the association between the first downlink positioning reference signal resource and the second downlink positioning reference signal resource is represented by the shift value, and wherein the shift value is an integer greater than 1.

17. The method of claim 13, wherein the first reference signal received power measurement and a third reference signal received power measurement are obtained by the user equipment with a same spatial domain filter.

18. The method of claim 13, wherein the first reference signal received power measurement and the second reference signal received power measurement are associated with a same timestamp.

* * * * *